United States Patent [19]

Nanao et al.

[11] Patent Number: 4,584,280

[45] Date of Patent: Apr. 22, 1986

[54] POROUS CERAMIC THIN FILM AND PROCESS FOR PREPARING THE SAME

[75] Inventors: Tsutomu Nanao; Tamiyuki Eguchi, both of Kobe, Japan

[73] Assignee: Kanegafuchi Kagaku Kogyo Kabushiki Kaisha, Osaka, Japan

[21] Appl. No.: 609,389

[22] Filed: May 11, 1984

[30] Foreign Application Priority Data

May 13, 1983 [JP] Japan .................................. 58-84795

[51] Int. Cl.$^4$ .......................... C04B 38/00; B32B 7/00
[52] U.S. Cl. .......................................... 501/80; 501/1;
501/12; 501/39; 501/83; 428/469; 427/247;
427/373; 427/388.2
[58] Field of Search .................. 501/84, 80, 1, 39, 83,
501/12; 106/75; 428/469; 427/247, 373, 388.2

[56] References Cited

U.S. PATENT DOCUMENTS

| | | | |
|---|---|---|---|
| Re. 30,284 | 5/1980 | Magee, Jr. .......................... 501/154 |
| 3,124,542 | 3/1964 | Kohn .................................... 501/80 |
| 3,261,894 | 7/1966 | Seidl ..................................... 501/80 |
| 3,484,376 | 12/1969 | Paris et al. .......................... 501/1 X |
| 3,597,252 | 8/1971 | Schröder et al. ................. 501/54 X |
| 3,782,982 | 1/1974 | Pierson et al. ...................... 106/75 |
| 3,850,665 | 11/1974 | Plumat et al. ........................... 350/1 |
| 4,332,907 | 6/1982 | Vieli ..................................... 106/75 |
| 4,397,338 | 8/1983 | Cunningham ........................ 106/75 |
| 4,397,666 | 8/1983 | Mishima et al. ................. 501/12 X |
| 4,472,512 | 9/1984 | Lane et al. ............................ 501/80 |

Primary Examiner—William R. Dixon, Jr.
Assistant Examiner—Karl Group
Attorney, Agent, or Firm—Armstrong, Nikaido, Marmelstein & Kubovcik

[57] ABSTRACT

A process for preparing a porous ceramic thin film which comprises applying an anhydrous solution containing an organometallic compound and a multifunctional organic compound to a substrate, and thermally decomposing the compounds. The porous ceramic thin film prepared by the process has pores of not more than 10 μm in pore size, and is useable as for materials of various sensors.

14 Claims, 2 Drawing Figures

5 μm

5 μm

POROUS CERAMIC THIN FILM AND PROCESS FOR PREPARING THE SAME

BACKGROUND OF THE INVENTION

The present invention relates to a porous ceramic thin film and a process for preparing the same.

Porous ceramics have been widely used for heat insulator and, recently, applied to a support of inmobilized enzyme, a carrier of catalyst and a separator. On the other hand, development of functional ceramics, particularly for a sensor has been conducted by utilizing their excellent electrical and chemical properties.

In general, a ceramic sensor exhibits its function mainly by converting chemical and electronical changes occurring on the surface of the ceramic to electric energy. Accordingly, the activity of the surface and characteristic of surface adsorption are important. For such purpose, an attempt to make the surface porous is being conducted.

However, since in conventional processes for preparing porous materials, large particles of a ceramic are simply packed to produce a bulk having large pores therebetween, it is very difficult to obtain the desired effect of the porous ceramic, i.e. activation of the surface by increasing the surface area.

An object of the present invention is to provide a process for preparing a highly functional thin film of porous ceramics by using a quite different process from conventional ones.

The process of the present invention is not involved in the conventional processes for preparing a porous material or a foamed material such as a solid phase reaction method and a melting foaming method, but concerns a process for directly preparing a thin film of a porous ceramic in the course of inorganization of an organometal compound, preferably a metal alkoxide and a hydrolysed material thereof by thermal decomposition. According to the process of the present invention a porous thin film of various kind of highly functional ceramics can be obtained.

Recently, attention has been paid to metal alkoxides which can provide very fine uniform ceramic materials by thermally decomposing the metal alkoxides directly or after being hydrolyzed. In addition, it is known that a ceramic thin film can be formed by thermally decomposing metal alkoxides after application of the solution thereof to a substrate.

In the course of studying a process for preparing a ceramic thin film from an organometal compound by adding various organic compounds to a solution of the organometal compound, the present invention has been completed from the fact that a porous ceramic thin film having unique characteristics can be obtained when a certain combination of the organometal compound and the organic compound is employed.

SUMMARY OF THE INVENTION

The present invention relates to a process for preparing a porous ceramic thin film which comprises applying a solution containing an organometal compound and a multifunctional organic compound to a substrate, and thermally decomposing the compounds.

According to the process of the present invention, there can be provided a porous ceramic thin film formed on a substrate having pores of not more than 10 μm in pore size which could not be prepared by the conventional processes.

DETAILED DESCRIPTION

Figure 1:
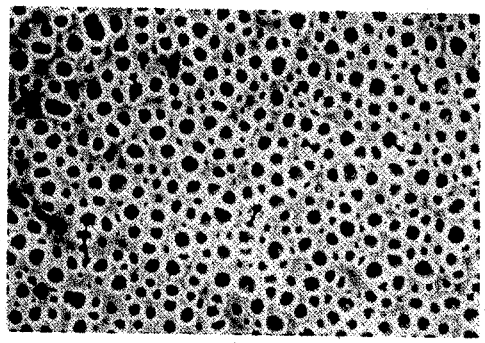
FIG. 1 shows a scanning electron microscopic photograph of the porous silicate thin film prepared in Example 1.

Various kinds of organometal complexes can be employed as the organometal compound in the present invention. Especially a metal alkoxide is preferable.

Preferable metal alkoxides are, for instance, metal alkoxides having single component, partial metal alkoxides and compound metal alkoxides represented by the formulas: $M^1(OR^1)_n$, $M^1(OR^2)_a(OR^3)_b$, $M^1(O)_a(OR^1)_b$ and $M^1[M^2(OR^1)_m]_n$ and oligomers thereof. In the formulas, $M^1$ and $M^2$ are the same or different metals, and each is lithium, sodium, potassium, rubidium, cesium, beryllium, magnesium, calcium, strontium, barium, titanium, zirconium, hafnium, vanadium, niobium, tantalum, chromium, molybdenum, tungsten, manganese, iron, nickel, cobalt, copper, zinc, cadmium, mercury, boron, aluminium, gallium, indium, thallium, cilicon, germanium, tin, lead, arsenic, antimony, bismuth, yttrium, selenium, tellurium, a metal lanthanoid, or the like. $R^1$, $R^2$ and $R^3$ are the same or different, and each is an organic residue. The preferable organic residue is an alkyl group, an aryl group, an alkenyl group, and arylalkyl group, or a hydroxylated derivative or a halogenated derivative thereof having 1 to 20 carbon atoms, particularly 1 to 8 carbon atoms. Also in the formulas, n and m are an integer, and a and b represent positive integers and the sum of a and b is the valency of the metal $M^1$. Q represents oxygen atom, nitrogen atom, a halogen atom, hydroxyl group or an organic functional group such as a carboxylic acid residue or a diketone residue having 1 to 20 carbon atoms.

Particularly preferable metal alkoxide is a metal alkoxide having di-or multi-valent metal or a condensated oligomer thereof which can produce a cross-linkage like structure with the multifunctional organic compound as explained hereinafter. Examples of the preferable metal are, for instance, zinc, aluminum, antimony, yttrium, indium, cadmium, gadolinium, gallium, calcium, chromium, silicon, germanium, cobalt, samarium, zirconium, tin, strontium, cesium, cerium, selenium, tungsten, tantalum, titanium, iron, copper, niobium, nickel, vanadium, barium, bismuth, boron, manganeses, manganese, molybdenum, lanthanum, and the like. Examples of the preferable alkoxy group, for instance, are alkoxy groups having 1 to 6 carbon atoms such as methoxide, ethoxide, n-propoxide, iso-propoxide, n-butoxide, tert-butoxide, and the like. In the metal alkoxides, a partial alkoxide having a halogen atom, hydroxyl group or an organic functional group excepting an alkoxy group may be employed. Furthermore, in the case of preparing a porous ceramic thin film containing at least two kinds of metals, there can be employed compound metal alkoxides, a mixed solution of two or more kinds of metal alkoxides, in which the hydrolytic characteristic of each metal alkoxide is adjusted approximately to the same value. Also a solution of metal alkoxide containing a metal chelate and/or a metal salt of a carboxylic acid or a reaction product therefrom may be employed for the starting materials.

The multifunctional organic compound in the present invention is, for instance, a compound having two or more kinds of the same or different functional groups such as a halogen atom, amino group, imide group, carboxyl group, carbonyl group, hydroxyl group and epoxy group within the molecule. Among them, it is preferable to employ an organic compound having at least two hydroxyl groups, especially alcoholic hydroxyl groups in the molecule. Preferable organic compounds containing at least two alcoholic hydroxyl groups in the molecule are, for instance, polyhydric alcohols, starches, calluloses, and the like. Examples of such organic compounds are, for instance, glycerin, 1,4-butanediol, pentaerythritol, dextrin, arginic acid, methyl cellulose, ethyl cellulose, hydroxyethyl celluloses, carboxymethyl cellulose, carboxymethyl starch, hydroxyethyl starch, polyvinyl alcohol, and a mixture thereof.

A solution used in the present invention can be prepared, for instance, by dissolving both of the organometal compound and the multifunctional organic compound in a co-solvent. Examples of the co-solvent are, for instance, an alcohol having 1 to 20 carbon atoms; a ketone; an ester; an aromatic compound such as benzine, or toluene; a nitrogen-containing organic solvent such as dimethylformamide, dimethylacetamide or N-methyl-2-piroridon; and a mixture thereof. The solvent to be practically used should be selected depending on the kind of the solvent and the combination of the organometal compound and the multifunctional organic compound.

In the present invention an additive such as an inorganic or organic metal salt, a thickening agent or a stablizier may be added, as ions as it does not interfere with the effects of the present invention.

In a preferable embodiment of the process of the present invention a porous ceramic thin film may be prepared by dissolving the organometal compound and the multifunctional organic compound in the co-solvent, applying the solution to a substrate, and then thermally decomposing the compounds. The solution is preferably applied after reacting the dissolved compounds by heat treatment. Since the heat treatment after dissolving the components in the co-solvent is conducted for accelerating the reaction between the organometal compound and the multifunctional organic compound, the solution is preferably refluxed below the boiling point of the solvent.

As a method for applying the solution to a substrate, a conventional method used in the preparation of a thin film of metal oxide by using a solution of a metal alkoxide can be employed. Such methods are, for instance, a spraying method, a dip-coating method, a spin-coating method, and the like.

The amount of the organometal compound in the solution is in a range of 0.5 to 20% (% by weight, hereinafter the same), preferably in a range of 3 to 10%. A percentage of the multifunctional organic compound to the organometal compound in the solution depends on kind of the components and the amount of the organometal compound. Excellent results are obtained when the percentage is in a range of 0.5 to 100%, preferably 5 to 30%.

After the film formed on a substrate is dried or hydrolyzed with moisture in atmosphere, the thermal decomposition is conducted at a temperature of not less than 200° C., and then, if necessary, the coated substrate is baked.

As the substrate to which the solution is applied, any material can be employed as long as it has resistance against the heat treatment. Examples of the substrates are, for instance, a ceramic plate made of glass, alumina, silica, and the like; a metal plate or foil made of stainless steel, and the like; a heat stable resin film made of polyimide, and the like. A preferable substrate has an excellent evenness.

The reason why a porous ceramic thin film can be prepared according to the process of the present invention has not yet been elucidated in detail, but it is assumed that when the metal alkoxide is mixed with the multifunctional organic compound having alcoholic hydroxyl groups within the molecule, a kind of exchange reaction takes place to produce a cross-linkage between the metal alkoxide and the multifunctional organic compound.

When a film of the solution formed on the substrate is heated, the solution is increased in viscosity and foamed, and then is thermally decomposed to produced a porous ceramic thin film.

According to the process of the present invention, a porous ceramic thin film which has never been prepared by the conventional processes can be prepared. The pore size of the porous ceramic thin film varies depending on mainly the kind of organometal compound, the kind of multifunctional organic compound, the proportion of the amounts thereof, conditions of the thermal treatment of the solution, conditions of the thermal decomposition and the baking treatment, the kind of substrate, and the like. The preferable pore size of the porous ceramic thin film is not more than 10 $\mu$m, especially not more than 5 $\mu$m. If the pore size is more than 10 $\mu$m, the strength of the obtained thin film becomes weak.

A ratio of the pore opening (percentage of area of pore region to total surface area (pore region plus region without pores) is preferably not less than 10%, and not more than 90% from the viewpoint of the strength of the film.

The thickness of the porous ceramic thin film of the present invention is usually not more than 50 $\mu$m, preferably not more than 20 $\mu$m. When the thickness is more than 50 $\mu$m, gases produced on the thermal decomposition are not released from the film and a carbide produced remains in the film.

The present invention is more particularly described and explained by means of the following Examples. It is to be understood that the present invention is not limited to the Examples and various changes and modifications may be made in the invention without departing from the spirit and scope thereof.

EXAMPLE 1

After 50 g of tetramer of tetraethylsilicate available from Nippon Korukoto Kagaku Kabushiki Kaisha as a Ethylislicate 40 was dissolved in 100 g of dry isopropyl alcohol, 20 g of ethyl alcohol solution containing 2% of 1% aqueous hydrochloric acid solution was added dropwise to the tetraethylsilicate solution with stirring to give a uniform transparent solution with a little heat generation. To the solution, 20 g of ethyl alcohol containing 3% hydroxy ethyl cellulose was added. The mixture obtained was refluxed for 20 minutes with stirring to give a viscous solution.

The resultant solution was dip-coated at a withdrawing speed of 10 cm/min on a plate of stainless steel of 0.3 mm in thickness and dried at natural temperature. The coated plate was heated in a muffle furnace by elevating the temperature at a rate of 5° C./min and maintaining at 500° C. for one hour. After gradually cooling, a transparent thin film of silicate was obtained.

The silicate film was a uniform porous thin film having about 0.4 μm in thickness and about 0.2 to 0.5 μm in pore size under scanning electron microscopic observation.

FIG. 1 shows a scanning electron microscopic photograph of the surface of the porous silicate thin film (magnification: 6000). In FIG. 1 the black parts show the pores.

EXAMPLE 2

After 10 g of indium isopropoxide was in 100 g of dry ethyl alcohol, and then 10 g of ethyl alcohol containing 3 g of glycerin was added to the indium isopropoxide solution with stirring to give a uniform solution. Under the same conditions as in Example 1, the solution was dip-coated to a plate of stainless steel and the film formed on the stainless steel was thermally decomposed and baked. A porous thin film of indium oxide having about 2000 Å in thickness and about 0.3 μm in pore size was obtained.

EXAMPLE 3

To 100 g of dry ethyl alcohol was added 8.4 g of barium acetylacetonate and 7.2 g of titanium tetraisopropoxide, and then 1 g of peraformaldehyde was added to the solution with stirring. The mixture obtained was refluxed for 15 minutes to give a uniform solution. After adding 20 g of ethyl alcohol containing 3% of glycerin to the uniform solution and stirring for 10 minutes at 60° C., a reddish brown viscous solution was obtained.

The solution was dip-coated on a plate of stainless steel in the same manner as in Example 1, and then the film was baked for one hour at 600° C. to give a porous thin film of barium titanate having about 2000 Å in thickness and about 0.2 μm in pore size was obtained.

EXAMPLE 4

The procedures in Example 1 were repeated except that 35 g of the ethyl alcohol solution containing 3% of hydroxyethyl cellulose was added to give a porous thin film of silicate having about 1 to 3 μm in pore size.

Figure 2:
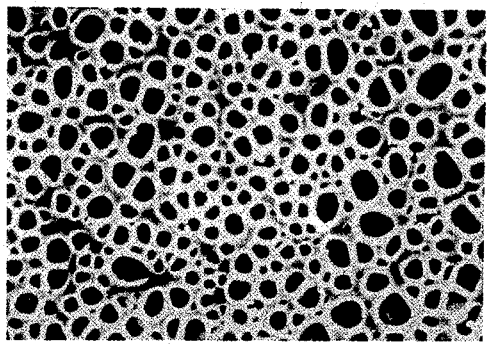
FIG. 2 shows a scanning electron microscopic photograph of the porous silicate thin film prepared in Example 4.

FIG. 2 shows a scanning electron microscopic photograph of the porous silicate thin film (magnification: 6000). In FIG. 2 the black parts show the pores.

What we claim is:

1. A process for preparing a porous ceramic thin film on a substrate which comprises applying an anhydrous solution comprising a metal alkoxide and an organic compound having at least two hydroxyl groups to a substrate, and thermally decomposing said metal alkoxide and organic compond having at least two hydroxyl groups at a temperature of not less than 200° C., whereby said porous ceramic thin film has a pore size of not more than 10 μm, a ratio of pore opening surface area to total surface area of 10% to 90%, and a thickness of not more than 50 μm.

2. The process of claim 1, wherein said metal alkoxide is a member selected from the group consisting of metal alkoxides represented by the formulas: $M^1(OR^1)_n$, $M^1(OR^2)_a(OR^3)_b$, $M^1(Q)_a(OR^1)_b$ and $M^1[M^2(OR^1)_m]_n$ wherein each of $M^1$ and $M_2$ is a metal atom selected from the group consisting of lithium, sodium, potassium, rubidium, cesium, beryllium, magnesium, calcium, strontium, barium, titanium, zirconium, hafnium, vanadium, niobium, tantalum, chromium, molybdenum, tungsten, manganese, iron, nickel, cobalt, copper, zinc, cadmium, mercury, boron, aluminum, gallium, indium, thallium, silicon, germanium, tin, lead, arsenic, antimony, bismuth, yttrium, selenium, tellurium, and a lanthanoid metal; $R^1$, $R^2$ and $R^3$ are the same or different organic residues; each of n and m is an integer provided that in $M^1(OR^1)_n$, n is equal to the valency of $M^1$, and in $M^1[M^2(OR^1)_m]_n$, m and n satisfy the equation: (m - valency of $M^2$) × n = valency of $M^1$; each of a and b is an integer and the sum of a and b is the valency of the metal $M^1$; Q is a member selected from the group consisting of a halogen, hydroxyl, a carboxylic acid residue having 1 to 20 carbon atoms and a diketone residue having 1 to 20 carbon atoms.

3. The process of claim 2, wherein each of $R^1$, $R^2$ and $R^3$ is an organic residue having 1–20 carbon atoms selected from the group consisting of alkyl, aryl, alkenyl, arylalkyl, and their hydroxylated derivatives, and halogenated derivatives.

4. The process of claim 2, wherein each of $R^1$, $R^2$ and $R^3$ is an alkyl group having 1 to 8 carbon atoms.

5. The process of claim 2, wherein said diketone is acetyl acetone.

6. The process of claim 1, wherein said organic compound having at least two hydroxyl groups has at least two alcoholic hydroxyl groups.

7. The process of claim 1, wherein said organic compound having at least two hydroxyl groups is a member selected from the group consisting of glycerin, 1,4-butanediol, pentaerythritol, dextrin, arginic acid, methyl cellulose, ethyl cellulose, hydroxyethyl cellulose, carboxymethyl cellulose, carboxymethyl starch, hydroxyethyl starch and polyvinyl alcohol.

8. A porous ceramic thin film or a substrate prepared by a process which comprises applying an anhydrous solution comprising a metal alkoxide and an organic compound having at least two hydroxyl groups to a substrate, and thermally decomposing said metal alkoxide and organic compound having at least two hydroxyl groups at a temperature of not less than 200° C., whereby said porous ceramic thin film has a pore size of not more than 10 μm, a ratio of pore opening surface area to total surface area of 10% to 90%, and a thickness of not more than 50 μm.

9. A porous ceramic thin film on a substrate as in claim 8, wherein said metal alkoxide is a member selected from the group consisting of metal alkoxides represented by the formulas: $M^1(OR^1)_n$, $M^1(O^{R2})_a(OR^3)_b$, $M^1(Q)_a(OR^1)_b$ and $M^1[M^2(OR^1)_m]_n$ wherein each of $M^1$ and $M_2$ is a metal atom selected from the group consisting of lithium, sodium, potassium, rubidium, cesium, beryllium, magnesium, calcium, strontium, barium, titanium, zirconium, hafnium, vanadium, niobium, tantalum, chromium, molybdenum, tungsten, manganese, iron, nickel, cobalt, copper, zinc, cadmium, mercury, boron, aluminum, gallium, indium, thallium, silicon, germanium, tin, lead, arsenic, antimony, bismuth, yttrium, selenium, tellurium and a lanthanoid metal; $R^1$, $R^2$ and $R^3$ are the same or different organic residues; each of n and m is an integer provided that in $M^1(OR^1)_n$, n is equal to the valency of $M^1$, and in $M^1[M^2(OR^1)_m]_n$, m and n satisfy the equation: (m - valency of $M^2$)×n=valency of $M^1$; each of a and b is an integer and the sum of a and b is the valency of the metal $M^1$; Q is a member selected from the group consisting of a halogen, hydroxyl, a carboxylic acid residue having 1 to 20 carbon atoms and a diketone residue having 1 to 20 carbon atoms.

10. A porous ceramic thin film on a substrate as in claim 9, wherein each of $R^1$, $R^2$ and $R^3$ is an organic residue having 1-20 carbon atoms selected from the group consisting of alkyl, aryl, alkenyl, arylalkyl, and their hydroxylated derivatives, and halogenated derivatives.

11. A porous ceramic thin film on a substrate as in claim 9, wherein $R^1$, $R^2$ and $R^3$ are alkyl groups having 1 to 8 carbon atoms.

12. A porous ceramic thin film on a substrate as in claim 9, wherein said diketone is acetyl acetone.

13. A porous ceramic thin film on a substrate as in claim 10, wherein said organic compound having at least two hydroxyl groups has at least two alcoholic hydroxyl groups.

14. A porous ceramic thin film on a substrate as in claim 10, wherein said organic compound having at least two hydroxyl groups is a member selected from the group consisting of glycerin, 1-4,butanediol, pentaerythritol, dextrin, arginic acid, methyl cellulose, ethyl cellulose, hydroxyethyl cellulose, carboxymethyl cellulose, carboxymethyl starch, hydroxyethyl starch and polyvinyl alcohol.

* * * * *